US012028587B2

(12) United States Patent
Arnao et al.

(10) Patent No.: US 12,028,587 B2
(45) Date of Patent: *Jul. 2, 2024

(54) STREAMING VIDEO PLAYBACK WITH REDUCED INITIAL LATENCY

(71) Applicant: The ADT Security Corporation, Boca Raton, FL (US)

(72) Inventors: Michael A. Arnao, Collegeville, PA (US); Maurice J. Buttimer, Newtown Square, PA (US)

(73) Assignee: The ADT Security Corporation, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/524,679

(22) Filed: Nov. 30, 2023

(65) Prior Publication Data

US 2024/0107132 A1 Mar. 28, 2024

Related U.S. Application Data

(63) Continuation of application No. 17/940,694, filed on Sep. 8, 2022, now Pat. No. 11,877,040.

(60) Provisional application No. 63/282,778, filed on Nov. 24, 2021.

(51) Int. Cl.
*H04N 21/8547* (2011.01)
*H04N 21/233* (2011.01)
*H04N 21/238* (2011.01)
*H04N 21/242* (2011.01)

(52) U.S. Cl.
CPC ....... *H04N 21/8547* (2013.01); *H04N 21/233* (2013.01); *H04N 21/238* (2013.01); *H04N 21/242* (2013.01)

(58) Field of Classification Search
CPC ............ H04N 21/8547; H04N 21/233; H04N 21/238; H04N 21/242
See application file for complete search history.

(56) References Cited

U.S. PATENT DOCUMENTS

| 2007/0064679 A1* | 3/2007 | Chitturi | H04L 65/401 |
| | | | 370/352 |
| 2007/0081562 A1* | 4/2007 | Ma | H04N 21/4302 |
| | | | 375/E7.025 |
| 2007/0185989 A1* | 8/2007 | Corbett | G08B 25/08 |
| | | | 709/224 |
| 2012/0075465 A1* | 3/2012 | Wengrovitz | H04N 7/181 |
| | | | 348/143 |

(Continued)

*Primary Examiner* — Mulugeta Mengesha
(74) *Attorney, Agent, or Firm* — Weisberg I.P. Law, P.A.

(57) ABSTRACT

According to one or more embodiments, a playback device is provided. The device includes processing circuitry configured to receive a video stream including a plurality of video packets, where each of the plurality of video packets is associated with a respective video timestamp value. The playback device is further configured to store at least one of the plurality of video packets in a jitter buffer, and to adjust each of the respective video timestamp values by a respective delay value, where each of the respective delay values is either a dynamic delay value based on a first condition being satisfied or a fixed delay value based on a second condition being satisfied. The playback device is further configured to play the video stream according to the adjusted video timestamp values for reduced initial delay at the jitter buffer.

18 Claims, 4 Drawing Sheets

(56) References Cited

U.S. PATENT DOCUMENTS

| | | | |
|---|---|---|---|
| 2014/0269749 A1* | 9/2014 | Bui | H04L 47/564 370/412 |
| 2014/0328578 A1* | 11/2014 | Shafron | H04N 21/26241 386/328 |
| 2021/0075465 A1* | 3/2021 | Park | H04B 15/04 |
| 2021/0337255 A1* | 10/2021 | Zhao | H04N 21/26241 |

* cited by examiner

STREAMING VIDEO PLAYBACK WITH REDUCED INITIAL LATENCY

CROSS-REFERENCE TO RELATED PATENT APPLICATION

This application is a continuation of and claims priority to U.S. Utility patent application Ser. No. 17/940,694, filed on Sep. 8, 2022, entitled STREAMING VIDEO PLAYBACK WITH REDUCED INITIAL LATENCY, which claims priority to U.S. Provisional Patent Application Ser. No. 63/282,778, filed Nov. 24, 2021, entitled STREAMING VIDEO PLAYBACK WITH REDUCED INITIAL LATENCY, the entirety of both of which are incorporated herein by reference.

TECHNICAL FIELD

This disclosure relates to a method and system for media playback, and in particular, to dynamic adjustment for zero or substantially zero initial latency for video playback.

INTRODUCTION

Streaming media, such as video on demand, has become commonplace in various aspects of life and technology as video cameras continue to decrease in form factor and have been designed for use in various devices and/or systems commonly used by the general public. For example, premises security systems may incorporate various video cameras throughout the system such as in a doorbell, nanny camera, attached to a motion sensor, mobile phone associated with the premises security system, etc. In another example, video cameras are often used to live-stream events via a software application installed on the mobile phone.

However, video transmission rates may vary based on various factors including, for example, network congestion and/or communication link quality. These variations can cause video packets in an internet protocol (IP) network to be received with varying delay between one or more video packets (e.g., jitter) and/or received out of order. In these situations, video playback at the receiver may have degraded video quality and/or associated audio quality to the point where portions of the video playback may be incomprehensible by the user viewing the video playback.

To help alleviate some of the issues caused by such delay or jitter, a streaming video receiver, at a receiver/playback device (e.g., mobile phone, tablet, etc.), may use a jitter buffer to smooth out variations in arrival time differences between successive video packets to achieve steady playback at the expense of some latency. That is, the jitter buffer adds a predefined delay to one or more packets in order to, for example, allow more video packets to be received between playback is started. Depending on the buffer length of the jitter buffer, the user may experience a long delay between the time at which playback is requested (and/or receipt of a first video packet/picture) and the time at which the first picture is displayed on the playback device. In particular, for video streaming, a typical buffering delay is on the order of hundreds of milliseconds, which may be in addition to any network delay. From the user's perspective, a delay is noticeable, i.e., long, when it exceeds approximately 20 milliseconds between the time playback is requested and the time the first picture is displayed. While such a long delay may be acceptable for video playback of movies, video conferences, etc., a long delay may hinder responses in an emergency and/or premises security system situation.

SUMMARY

Some embodiments advantageously provide a method and system for dynamic adjustment for zero or substantially zero initial latency for video playback.

This method addresses the initial delay by displaying the initial pictures soon after receiving them, beginning playback with effectively zero buffer delay, and gradually increasing the delay to a target value. For example, initial pictures/video packet(s) may be displayed as soon as overhead processes (e.g., decoding, rendering, etc.) are complete at the playback device, whereas other pictures/video packet(s) may be subject to increased delay on top of the delay caused by overhead processes. In other words, playback for pictures/video packets may be a half speed or less than a default full speed playback until the target value is reached.

According to one aspect of the present invention, a playback device is provided. The playback device includes processing circuitry configured to receive a video stream including a plurality of video packets, where each of the plurality of video packets is associated with a respective video timestamp value. The playback device is further configured to store at least one of the plurality of video packets in a jitter buffer. The playback device is further configured to adjust each of the respective video timestamp values by a respective delay value, where each of the respective delay values is either a dynamic delay value based on a first condition being satisfied or a fixed delay value based on a second condition being satisfied. The playback device is further configured to play the video stream according to the adjusted video timestamp values for reduced initial delay at the jitter buffer.

According to one or more embodiments, the video stream includes a plurality of audio packets, each of the plurality of audio packets associated with a respective audio timestamp value. Each of the respective audio timestamp values is adjusted by the fixed delay value. According to one or more embodiments, the video stream is received from at least one premises device in a premises security system, where the video stream is associated with a state of the premises device. According to one or more embodiments, the first condition includes the state of the premises device being an emergency state, and the second condition including the state of the premises device being a non-emergency state. According to one or more embodiments, the state of the premises device is associated with an alarm confidence score. The first condition includes the alarm confidence score being above a preconfigured threshold. The second condition includes the alarm confidence score being below the preconfigured threshold. In one or more embodiments, the state of the premises device is associated with a first location. The first condition includes the first location being proximate to a second location associated with the playback device. The second condition includes the first location being not proximate to the second location. According to one or more embodiments, the first condition includes the respective video timestamp having a value less than T, where T is a preconfigured timestamp value. The second condition includes the respective video timestamp having a value greater than T. In one or more embodiments, the jitter buffer is utilized for at least one of the plurality of video packets based on the at least one of the plurality of video packets having a respective video timestamp value greater than T.

According to one or more embodiments, the dynamic delay value is determined based on a monotonic function. In one or more embodiments the monotonic function is according to $R(t)=t*D/T$, where t is the respective video timestamp value before adjustment, R(t) is the dynamic delay value for t, and D is the fixed delay value.

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein.

DETAILED DESCRIPTION

Figure 1:
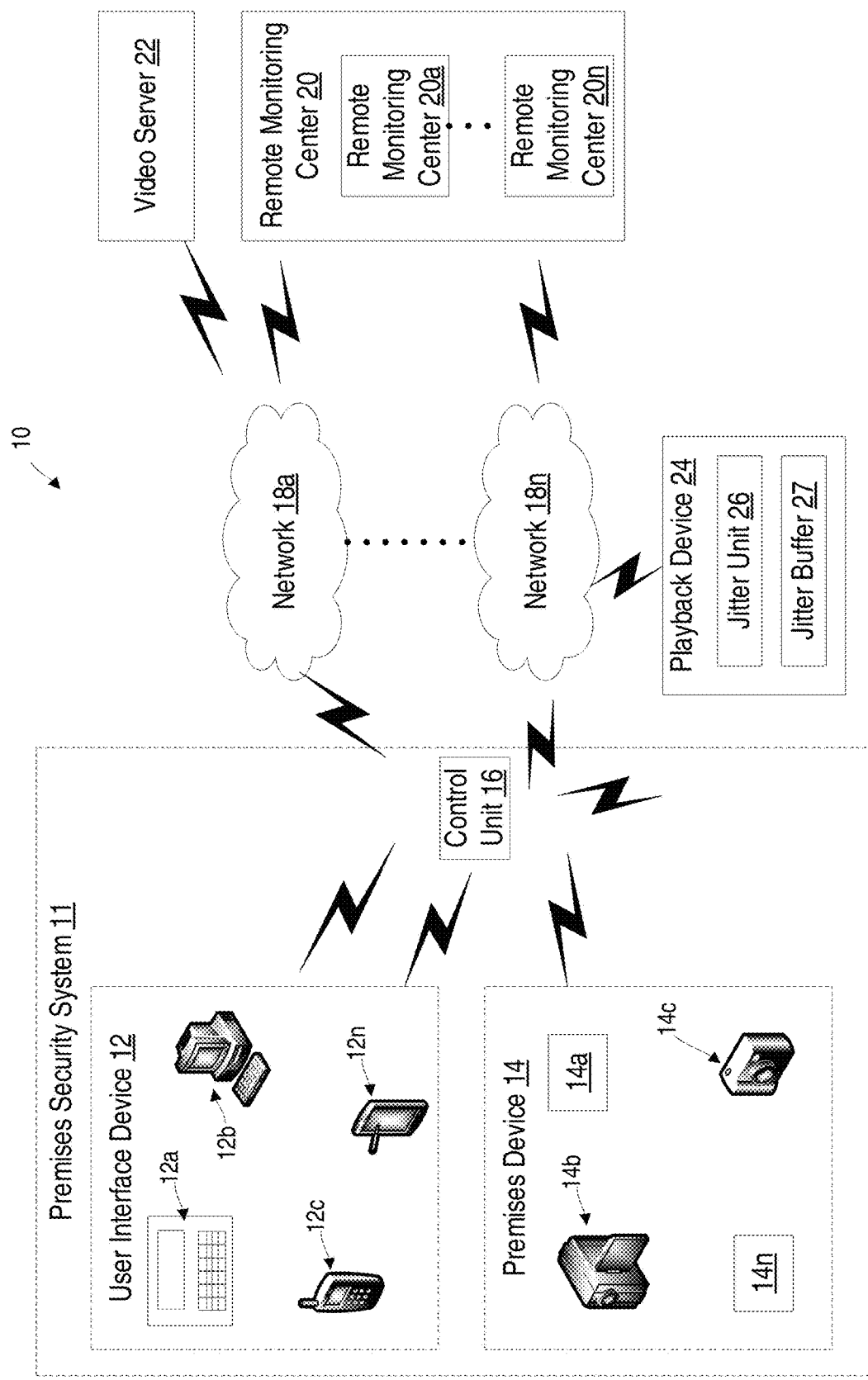
FIG. 1 is a diagram of a system in accordance with one or more embodiments of the present invention.

Before describing in detail exemplary embodiments, it is noted that the embodiments reside primarily in combinations of apparatus components and processing steps related to dynamic adjustment for zero or substantially zero initial latency introduced by the video jitter buffer for video playback. Accordingly, the system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In one or more embodiments, "zero initial latency" may refer to an initial delay of the video jitter buffer minus any overhead delay (e.g., delay caused by decoding, rendering, etc.). In one or more embodiments, "zero initial latency" corresponds to a time between receipt and display of a picture of the video stream such as the initial picture/image of the video stream.

Referring now to the drawing figures in which like reference designators refer to like elements there is shown in FIG. 1 a system designated generally as "10." System 10 may include premises security system 11 where premises security system 11 includes one or more user interface devices 12a to 12n (collectively referred to as "user interface device(s) 12"), one or more premises devices 14a to 14n (collectively referred to as "premises device(s) 14"), and control unit 16. System 10 may further include one or more networks 18a to 18n (collectively referred to as "network 18"), one or more remote monitoring centers 20a to 20n (collectively referred to as "remote monitoring center(s) 20"), one or more video servers 22 and one or more playback devices 24 (also referred to as device 24), communicating with each other or with at least one other entity in system 10.

User interface device 12 may be a wireless device that allows a user to communicate with control unit 16. User interface device 12 may be a portable control keypad/interface 12a, computer 12b, mobile phone 12c and tablet 12n, among other devices that allow a user to interface with control unit 16. User interface device 12 may communicate at least with control unit 16 using one or more wireless communication protocols well known to those of ordinary skill in the art. For example, portable control keypad 12a may communicate with control unit 16 via a ZigBee based communication link, e.g., network based on Institute of Electrical and Electronics Engineers (IEEE) 802.15.4 protocols, and/or Z-wave based communication link, or over the premises' local area network, e.g., network-based on IEEE 802.11 protocols.

Premises devices 14 may include one or more types of sensors, control and/or image capture devices. For example, the types of sensors may include various safety related sensors such as motion sensors, fire sensors, carbon monoxide sensors, flooding sensors and contact sensors, among other sensor types that are known in the art. The control devices may include, for example, one or more life style related devices configured to adjust at least one premises setting such as lighting, temperature, energy usage, door lock and power settings, among other settings associated with the premises or devices on the premises. Image capture devices may include a digital camera and/or video camera, among other image captures devices that are well known in the art. Premises device 14 may communicate with control unit 16 via proprietary wireless communication protocols and/or may use Wi-Fi, both of which are known in the art. Other communication technologies can also be used, and the use of Wi-Fi is merely an example. Those of ordinary skill in the art will also appreciate that various additional sensors and/or control and/or image capture devices may relate to life safety or life style depending on both what functions the sensors, control, and image capture devices perform and how these sensors, control, and image devices are used by system 10.

Control unit 16 may provide management functions such as power management, premises device management and alarm management, among other functions to premises security system 11. In particular, control unit 16 may manage one or more life safety and life style features. Life safety features may correspond to security system functions and settings associated with premises conditions that may result in life threatening harm to a person such as carbon monoxide detection and intrusion detection. Life style features may correspond to security system functions and settings associated with video capturing devices and non-life-threatening conditions of the premises such as lighting and thermostat functions.

Control unit 16 may communicate with network 18 via one or more communication links. In particular, the communications links may be broadband communication links such as a wired cable modem or Ethernet communication link, and digital cellular communication link, e.g., long term evolution (LTE) and/or 5G based link, among other broadband communication links known in the art. Broadband as used herein may refer to a communication link other than a plain old telephone service (POTS) line. An Ethernet communication link may, for example, be an IEEE 802.3 or 802.11 based communication link Network 18 may be a wide area network, local area network, wireless local network, and metropolitan area network, among other networks known in the art. Network 18 provides communications between control unit 16 and remote monitoring center 20. In one or more embodiments, control unit 16 may be part of premises device 14 or user interface 12.

In some embodiments, video captured by one or more premises devices 14 is transmitted to video server 22 for processing for transmission to playback device 24. In some embodiments, playback device 24 is able to connect directly to one or more premises devices and/or control unit 16 to allow for direct video playback, thereby by-passing the video server 22.

Playback device 24 may correspond to any wired and/or wireless device that is configured to playback received video. For example, playback device 24 may be a mobile device, smart TV monitor, laptop, tablet, etc. In one or more embodiments, playback device 24 may also provide functionality of a user interface device 12. Playback device 24 includes jitter unit 26 that is configured to perform one or more playback functions described herein such as with respect to dynamic jitter adjustment. Alternatively, jitter unit 26 may be implemented at another entity in system 10. Playback device 24 includes jitter buffer 27 that is a temporary storage buffer used to capture incoming packets since, for example, packet arrival times may vary between packets. The jitter buffer 27 may be configured with a default delay setting for smoothing out packet arrival times such that the default setting may introduce a delay from the time at least one packet or image of a video stream is received (minus processing overhead) to the time the image is displayed.

Example implementations, in accordance with one or more embodiments, of playback device 24 discussed in the preceding paragraphs will now be described with reference to FIG. 2.

The system 10 includes a playback device 24 that includes hardware 28 enabling it to communicate with one or more entities in system 10 and to perform one or more functions described herein. The hardware 28 may include a communication interface 30 for setting up and maintaining at least a wired and/or wireless connection to one or more entities in system 10 such as to video server 22, premises device 14, control unit 16, etc. Communication interface 30 may include video receiver 32 that is configured to receive and process video and/or audio packets for playback by payback device 24.

In the embodiment shown, the hardware 28 of the playback device 24 further includes processing circuitry 34. The processing circuitry 34 may include a processor 36 and a memory 38. In particular, in addition to or instead of a processor, such as a central processing unit, and memory, the processing circuitry 34 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 36 may be configured to access (e.g., write to and/or read from) the memory 38, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the playback device 24 further has software 40 stored internally in, for example, memory 38, or stored in external memory (e.g., database, storage array, network storage device, etc.) accessible by the playback device 24 via an external connection. The software 40 may be executable by the processing circuitry 34. The processing circuitry 34 may be configured to control any of the methods and/or processes described herein and/or to cause such methods, and/or processes to be performed, e.g., by playback device 24. Processor 36 corresponds to one or more processors 36 for performing playback device 24 functions described herein. The memory 38 is configured to store data, programmatic software code and/or other information described herein. In some embodiments, the software 40 may include instructions that, when executed by the processor 36 and/or processing circuitry 34, causes the processor 36 and/or processing circuitry 34 to perform the processes described herein with respect to playback device 24. For example, processing circuitry 34 of the playback device 24 may include jitter unit 26 which is configured to perform one or more playback device 24 functions described herein such as with respect to dynamic jitter adjustment to provide zero or substantially zero initial latency for a video (e.g., type of media) playback. Further, playback device 24 includes jitter buffer 27, described above, that may be implemented by software and/or hardware (e.g., memory 38).

Figure 2:
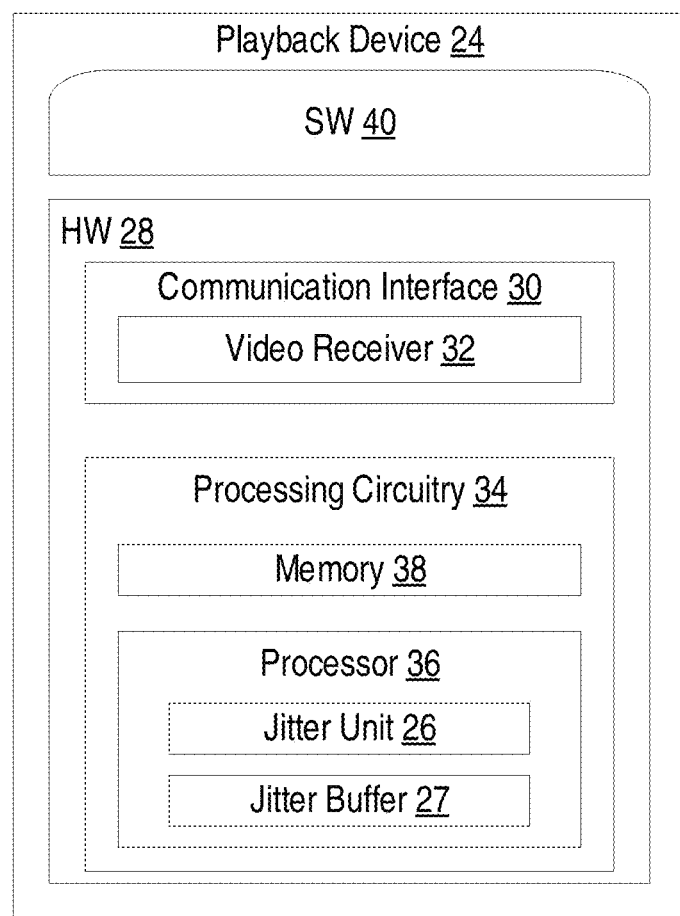
FIG. 2 is a diagram of a playback device in accordance with one or more embodiments of the present invention.

Although FIGS. 1 and 2 show various jitter unit 26 as being within a respective processor, it is contemplated that this unit may be implemented such that a portion of the unit is stored in a corresponding memory within the processing circuitry. In other words, the unit may be implemented in hardware or in a combination of hardware and software within the processing circuitry.

Figure 3:
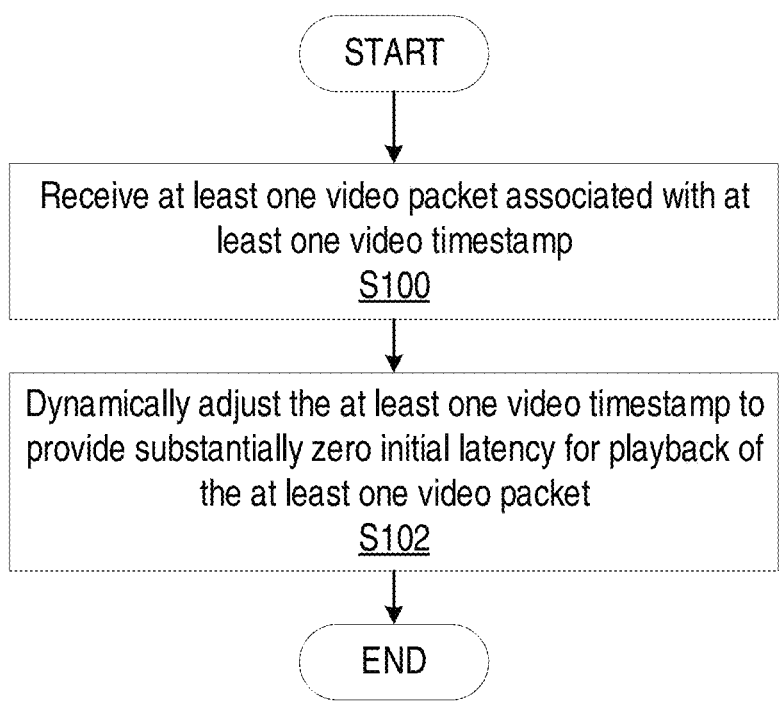
FIG. 3 is a flowchart of an example process in accordance with one or more embodiments of the present invention.

FIG. 3 is a flowchart of an example process in a playback device 24 according to one or more embodiments of the present invention. One or more blocks described herein may be performed by one or more elements of playback device 24 such as by one or more of processing circuitry 34 (including the jitter unit 26), processor 36, and/or video receiver 32. Playback device 24 is configured to receive (Block S100) at least one video packet associated with at least one video timestamp, as described herein. Playback device 24 is configured to dynamically adjust (Block S102) the at least one video timestamp to provide substantially zero initial latency for playback of the at least one video packet, as described herein. The video packet may include one or more images of a video stream. In one or more embodiments, the initial image in the video packet is displayed for playback with zero or substantially zero initial latency where the time between receipt of the initial image and display of the initial image may not include a predefined additional delay from the jitter buffer and/or may only include delay from processing overhead (e.g., delay in decoding and rendering of the image/video packet at playback device 24).

According to one or more embodiments, the at least one video timestamp is adjusted by a value within a range of values based on the at least one video timestamp having a value less than T, and the at least one video timestamp value is adjusted by a fixed value based on the video timestamp having a value greater than or equal to T. According to one or more embodiments, the processing circuitry 34 is further configured to: receive at least one audio packet having at least one audio timestamp, the at least one audio packet being associated with the at least one video packet (e.g., at least one image of the at least one video packet); and adjust the at least one audio timestamp by a predefined amount for audio playback where the video playback of the at least one video packet configured to temporarily lead the audio playback of the at least one audio packet. According to one or more embodiments, the at least one video packet temporarily leads the audio playback of the at least one audio packet until the predefined video timestamp value T.

According to one or more embodiments, the dynamic adjustment of the at least one video timestamp is based on a monotonic function. According to one or more embodiments, the at least one video packet is provided by at least one premises device in a premises security system 11, the at least one video packet being associated with at least one triggered alarm.

Figure 4:
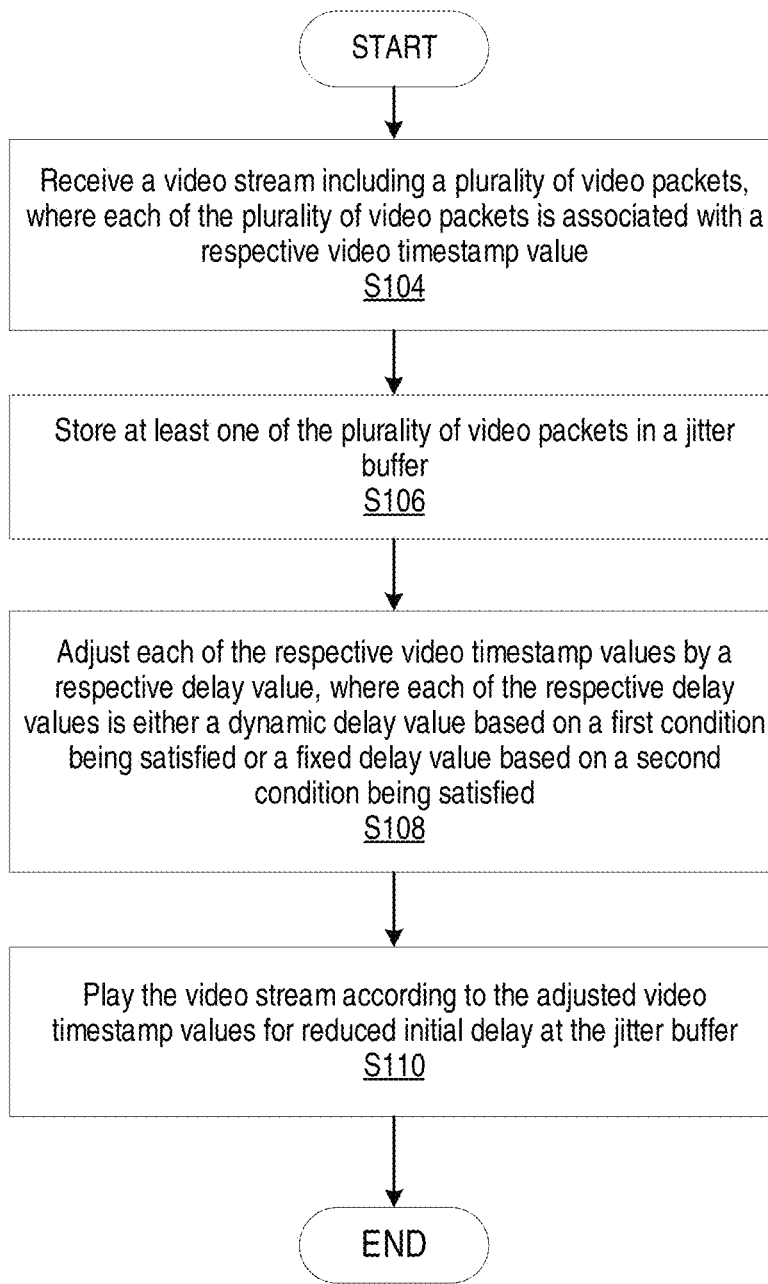
FIG. 4 is a flowchart of another example process in accordance with one or more embodiments of the present invention.

FIG. 4 is a flowchart of another example process in a playback device 24 according to one or more embodiments of the present invention. One or more blocks described herein may be performed by one or more elements of playback device 24 such as by one or more of processing circuitry 34 (including the jitter unit 26 and/or jitter buffer 27), processor 36, and/or video receiver 32. Playback device 24 is configured to receive (Block S104) a video stream including a plurality of video packets, where each of the plurality of video packets is associated with a respective video timestamp value. Playback device 24 is configured to store (Block S106) at least one of the plurality of video packets in a jitter buffer 27. For example, the jitter buffer 27 may temporarily store at least one of the plurality of video packets. Playback device 24 is configured to adjust (Block S108) each of the respective video timestamp values by a respective delay value, where each of the respective delay values is either a dynamic delay value based on a first condition being satisfied or a fixed delay value based on a second condition being satisfied. Playback device 24 is configured to play (Block S110) the video stream according to the adjusted video timestamp values for reduced initial delay at the jitter buffer 27.

In one or more embodiments, the video stream includes a plurality of audio packets, each of the plurality of audio packets associated with a respective audio timestamp value. Each of the respective audio timestamp values is adjusted by the fixed delay value. In one or more embodiments, the video stream is received from at least one premises device 14 in a premises security system 11, where the video stream is associated with a state of the premises device 14. In one or more embodiments, the first condition includes the state of the premises device 14 being an emergency state, and the second condition including the state of the premises device 14 being a non-emergency state. In one or more embodiments, the state of the premises device 14 is associated with an alarm confidence score. The first condition includes the alarm confidence score being above a preconfigured threshold. The second condition includes the alarm confidence score being below the preconfigured threshold. In one or more embodiments, the state of the premises device 14 is associated with a first location. The first condition includes the first location being proximate to a second location associated with the playback device 24. The second condition includes the first location being not proximate to the second location. In one or more embodiments, the first condition includes the respective video timestamp having a value less than T, where T is a preconfigured timestamp value. The second condition includes the respective video timestamp having a value greater than T. In one or more embodiments, the jitter buffer 27 is utilized for at least one of the plurality of video packets based on the at least one of the plurality of video packets having a respective video timestamp value greater than T. In one or more embodiments, the dynamic delay value is determined based on a monotonic function. In one or more embodiments the monotonic function is according to $R(t)=t*D/T$, where t is the respective video timestamp value before adjustment, $R(t)$ is the dynamic delay value for t, and D is the fixed delay value.

Having generally described arrangements for dynamic adjustment for zero or substantially zero initial latency for video playback, details for these arrangements, functions and processes are provided as follows, and which may be implemented by the playback device 24 and/or other entity in system 10.

One or more functions described below may be performed by one or more of video receiver 32, processing circuitry 34, processor 36, jitter unit 26, etc. In one or more embodiments, video timestamps up to a value T are offset, e.g., by the video receiver 32, processing circuitry 34, etc., by the value of a function R(t), which can be a monotonic function, whose value ranges from zero to a target delay D.

If an accompanying audio stream is present, the audio timestamps are offset by fixed amount D, such that the audio and video streams become synchronized at timestamp value T. That is, the perceived effect of one example of the timestamp adjustment described herein is a shorter wait time from the moment playback is requested to the moment the first picture of the video stream is displayed, along with an initial slow-motion video side-effect with video leading the audio (e.g., due to the fixed amount of delay D) until the frame with a timestamp T has been processed. Using a fixed delay for the audio packets allows the audio stream to be played back at a fixed rate, avoiding undesirable artifacts. In one or more embodiments, playback may occur at less than full speed (e.g., default playback speed) until the target delay is reached. In one example, less than full speed may correspond to half speed.

By configuring the playback device 24 (with the video receiver 32) to offset the video timestamps and audio timestamps of packets up to a value T, the playback device 24 is able to playback video with substantially zero delay for initial video playback (e.g., zero, substantially zero or less than 20 ms delay between receipt of a video packet (with one or more image/video images) and display of the one or more images/video images) even though the playback device 24 implements a jitter buffer 27. That is, the jitter buffer may be configured with a default delay configuration but one or more video packets (e.g., initial video packet) are treated differently as described herein, thereby allowing for zero/substantially zero delay for initial video playback. In one example, substantially zero delay may include processing delay, which may be on the order of milliseconds and may be less delay time than the preconfigured target delay. This allows for video playback for premises security system 11 to occur quickly (i.e., faster than existing system) as the requested and/or triggered video is associated with the premises security system 11 and may relate to an emergency situation where zero (or substantially zero) initial latency is vital to analyzing an emergency situation.

Once the target video delay is achieved and/or once the frame with timestamp T has been processed, any further adjustments to the audio and video timestamps can be left to the jitter buffer 27. For example, may be left to the default or preconfigured settings of the jitter buffer 27.

This method could be incorporated into the jitter buffer 27 itself, or it could be implemented in standalone form and precede the jitter buffer 27.

After applying a scale factor (i.e., scaling factor) and offset to video timestamps t_v and audio timestamps t_a such that timestamps are in units of seconds and start at zero for a given streaming session, where the starting at zero after applying a scale factor and offset corresponds to zero initial latency. For example, the timestamps (e.g., timestamp values) of video and audio packets may be adjusted as follows:

Video Timestamp Adjustment:

$$t\_v'=t\_v+R(t\_v),$$

where $$R(t)=t\ D/T, t<=T$$

$$R(t)=D, t>T$$

in the case of a linear ramp, where $$D=\text{target delay (seconds)}$$

$$T=\text{timestamp value at which target delay is achieved (seconds)}$$

Note that R(t) may consist of a monotonic function, where R(0)=0 and R(T)=D.

Audio Timestamp Adjustment:

$$t\_a'=t\_a+D$$

The perceived effect of the timestamp adjustment is a shorter wait time from the moment playback is requested to the moment the first picture of the video stream is displayed, along with an initial slow-motion video side-effect with video leading audio until frame with timestamp T has been processed.

In one or more embodiments, video timestamps and audio timestamps are typically based on different clocks and thus are not directly comparable. For example, a typical clock rate for a video stream is 90 kHz, while a typical clock rate for an audio stream matches the audio sample rate, e.g., 8 kHz. To convert timestamps to units of seconds, thus allowing comparison, a scale factor equal to the inverse of the clock rate may be applied. For the example values of clock rate of 90 kHz and 8 kHz, the scale factor would be 1/90000 for video timestamps and 1/8000 for audio timestamps.

In one or more embodiments, the dynamic adjustment of the video timestamp may be triggered based on or more factors. For example, the dynamic adjustment may be triggered based on a type of alarm such that, for example, the dynamic adjustment may be triggered for an emergency alarm (e.g., fire alarm, etc.) while the dynamic adjustment may not be triggered by a motion based alarm in the backyard or by a notification alarm indicating someone is at the front door. In another example, the dynamic adjustment may be triggered based on a confidence score of the alarm such that an alarm with a confidence score below a threshold (e.g., likely a false alarm) may or may not trigger the dynamic adjustment described herein. In another example, the dynamic adjust may be triggered based on whether the playback device 24 is sensed or determined to be within or proximate the premises security system 11 where such a detection may be determined by one or more of wireless communication sensing, video analytics where identification of a user by a premises device 14 implies the playback device 24 is in the same location, etc.

In one or more examples, the scaling factor(s) are used only to convert video and audio timestamps to units of seconds, and the offsets are used only to adjust the video and audio timestamps to start at zero at the beginning of the stream such that, the calculations employed by the system and method described herein may require that the timestamps be specified in units of seconds and start at zero. The conversion may be required in the case of timestamps that do not fit those requirements.

The above examples may be modified such that the dynamic adjustment described herein is triggered based on one or more of the conditions or criteria described above being met or not met.

Hence, one or more embodiments described herein advantageously provide zero or substantially zero initial latency for playback of video and/or audio associated with a premises security system 11, thereby allowing a user and/or remote monitoring center to receive a faster playback of media for quicker initial analysis of a possible emergency situation at a premises.

While one or more embodiments and/or one or more examples were described with reference to a premises security system, the teachings described herein are equally applicable to other use cases that may not be related to a premises security system.

SOME EXAMPLES

Example A1. A device (e.g., playback device 24), comprising: processing circuitry 34 configured to: receive at least one video packet associated with at least one video timestamp; and dynamically adjust the at least one video timestamp to provide substantially zero initial latency for playback of the at least one video packet.

Example A2. The device of Example A1, wherein the at least one video timestamp is adjusted by a value within a range of values based on the at least one video timestamp having a value less than T; and the at least one video timestamp value is adjusted by a fixed value based on the video timestamp having a value greater than or equal to T.

Example A3. The device 24 of any one of Examples A1-A2, wherein the processing circuitry 34 is further configured to: receive at least one audio packet having at least one audio timestamp, the at least one audio packet being associated with the at least one video packet; adjust the at least one audio timestamp by a predefined amount for audio playback, the video playback of the at least one video packet configured to temporarily lead the audio playback of the at least one audio packet.

Example A4. The device 24 of Example A3, wherein the at least one video packet temporarily leads the audio playback of the at least one audio packet until the predefined video timestamp value T.

Example A5. The device 24 of any one of Examples A1-A4, wherein the dynamic adjustment of the at least one video timestamp is based on a monotonic function.

Example A6. The device 24 of any one of Examples A1-A5, wherein the at least one video packet is provided by at least one premises device in a premises security system, the at least one video packet being associated with at least one triggered alarm.

Example A7. A method implemented by a device 24, comprising: receiving at least one video packet associated with at least one video timestamp; dynamically adjusting the at least one video timestamp to provide substantially zero initial latency for playback of the at least one video packet.

Example A8. The method of Example A7, wherein the at least one video timestamp is adjusted by a value within a range of values based on the at least one video timestamp having a value less that T; and the at least one video timestamp value is adjusted by a fixed value based on the video timestamp having a value greater than or equal to T.

Example A9. The method of any one of Examples A7-A8, further comprising: receiving at least one audio packet having at least one audio timestamp, the at least one audio packet being associated with the at least one video packet; and adjusting the at least one audio timestamp by a predefined amount for audio playback, the video playback of the at least one video packet configured to temporarily lead the audio playback of the at least one audio packet.

Example A10. The method of Example A9, wherein the at least one video packet temporarily leads the audio playback of the at least one audio packet until the predefined video timestamp value T.

Example A11. The method of any one of Examples A7-A10, wherein the dynamic adjustment of the at least one video timestamp is based on a monotonic function.

Example A12. The method of any one of Examples A7-A11, wherein the at least one video packet is provided by at least one premises device in a premises security system, the at least one video packet being associated with at least one triggered alarm.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed:

1. A playback device comprising:
   at least one processor; and
   at least one computer-readable medium storing a plurality of instructions that, when executed by the at least one processor, cause the at least one processor to:
   receive a video stream from at least one premises device in a premises security system, the video stream being associated with a state of the premises device, the video stream comprising a plurality of video packets, each of the plurality of video packets being associated with a respective video timestamp value of a plurality of video timestamp values;
   store at least one of the plurality of video packets in a jitter buffer;
   adjust at least a subset of the respective video timestamp values by a respective delay value of a plurality of delay values to generate a plurality of adjusted video timestamp values, each respective delay value being a function of a target delay value and a timestamp value at which a target delay is achieved; and
   play at least a portion of the video stream according to the plurality of adjusted video timestamp values.

2. The playback device of claim 1, wherein the video stream further comprises a plurality of audio packets, each of the plurality of audio packets being associated with a respective audio timestamp value of a plurality of audio timestamp values; and
   the plurality of instructions being further configured to cause the at least one processor to adjust at least a subset of the respective audio timestamp values by a fixed delay value.

3. The playback device of claim 1, wherein the function comprises a dynamic delay value that is based on a first condition being met and a fixed delay value that is based on a second condition being met.

4. The playback device of claim 3, wherein the first condition comprises the state of the premises device being an emergency state; and
   the second condition comprises the state of the premises device being a non-emergency state.

5. The playback device of claim 4, wherein the state of the premises device is associated with an alarm confidence score;
   the first condition comprises the alarm confidence score being above a preconfigured threshold; and
   the second condition comprises the alarm confidence score being below the preconfigured threshold.

6. The playback device of claim 4, wherein the state of the premises device is associated with a first location;
   the first condition comprises the first location being proximate to a second location associated with the playback device; and
   the second condition comprises the first location being not proximate to the second location.

7. The playback device of claim 3, wherein the first condition comprises the respective video timestamp value having a value less than T, where T is a preconfigured timestamp value; and
   the second condition comprises the respective video timestamp value having a value greater than T.

8. The playback device of claim 7, wherein the plurality of instructions is further configured to cause the at least one processor to use the jitter buffer for at least one of the plurality of video packets based on the at least one of the plurality of video packets having a respective video timestamp value greater than T.

9. The playback device of claim 8, wherein the function is according to:

$$R(t)=t*D/T$$

where t is the respective video timestamp value before adjustment, R(t) is the dynamic delay value for t, and D is the fixed delay value.

10. A method implemented in a playback device, the method comprising:
    receiving a video stream from at least one premises device in a premises security system, the video stream being associated with a state of the premises device, the video stream comprising a plurality of video packets, each of the plurality of video packets being associated with a respective video timestamp value of a plurality of video timestamp values;
    storing at least one of the plurality of video packets in a jitter buffer;
    adjusting at least a subset of the respective video timestamp values by a respective delay value of a plurality of delay values to generate a plurality of adjusted video timestamp values, each respective delay value being a function of a target delay value and a timestamp value at which a target delay is achieved; and
    playing at least a portion of the video stream according to the plurality of adjusted video timestamp values.

11. The method of claim 10, wherein the video stream further comprises a plurality of audio packets, each of the plurality of audio packets being associated with a respective audio timestamp value of a plurality of audio timestamp values; and
    the method further comprises adjusting at least a subset of the respective audio timestamp values by a fixed delay value.

12. The method of claim 10, wherein the function comprises a dynamic delay value that is based on a first condition being met and a fixed delay value that is based on a second condition being met.

13. The method of claim 12, wherein the first condition comprises the state of the premises device being an emergency state; and
    the second condition comprises the state of the premises device being a non-emergency state.

14. The method of claim 13, wherein the state of the premises device is associated with an alarm confidence score;
    the first condition comprises the alarm confidence score being above a preconfigured threshold; and
    the second condition comprises the alarm confidence score being below the preconfigured threshold.

15. The method of claim 13, wherein the state of the premises device is associated with a first location;
    the first condition comprises the first location being proximate to a second location associated with the playback device; and
    the second condition comprises the first location being not proximate to the second location.

16. The method of claim 12, wherein the first condition comprises the respective video timestamp value having a value less than T, where T is a preconfigured timestamp value; and
    the second condition comprises the respective video timestamp value having a value greater than T.

17. The method of claim 16, further comprising using the jitter buffer for at least one of the plurality of video packets based on the at least one of the plurality of video packets having a respective video timestamp value greater than T.

18. The method of claim 17, wherein the function is according to:

$$R(t)=t*D/T$$

where t is the respective video timestamp value before adjustment, R(t) is the dynamic delay value for t, and D is the fixed delay value.

\* \* \* \* \*